United States Patent [19]

Furman

[11] 4,247,220
[45] Jan. 27, 1981

[54] SUBTERRANEAN STORAGE OF LIQUIDS

[76] Inventor: Vladimir Furman, P.O. Box 339, Safed, Israel

[21] Appl. No.: 965,383

[22] Filed: Dec. 1, 1978

[30] Foreign Application Priority Data

Dec. 5, 1977 [IL] Israel ........................ 53537

[51] Int. Cl.³ .............................................. B65G 5/00
[52] U.S. Cl. ........................................ 405/53; 220/18;
220/222; 405/259
[58] Field of Search ............... 405/53, 55, 59; 220/18, 220/216, 222

[56] References Cited
U.S. PATENT DOCUMENTS

| | | | |
|---|---|---|---|
| 3,325,999 | 6/1967 | Schroeder et al. | 220/18 X |
| 3,330,118 | 7/1967 | Biais | 405/53 |
| 3,583,594 | 6/1971 | Belanger et al. | 220/222 X |
| 3,943,721 | 3/1976 | Azalbert et al. | 405/53 X |
| 4,068,480 | 1/1978 | Lefever et al. | 405/59 |

FOREIGN PATENT DOCUMENTS 2059940  6/1971  France ........................ 405/53

Primary Examiner—David H. Corbin
Attorney, Agent, or Firm—Browdy and Neimark

[57] ABSTRACT

A liquid such as crude oil or fuel is stored in a subterranean pool covered with a diaphram-like cover plate sealingly applied thereto. On the cover plate is superimposed a protective body consisting of sand, soil, stones, rubbish, rocks or mixtures thereof. The protective body may be level with the terrain or be projecting thereabove. Inside the pool a pressure is established hydraulically or pneumatically equal to that exerted by the protective body on the cover plate and in this way the protective body is sustained via the cover plate. For the hydraulic method a pressurized working liquid is used, e.g. water. For the pneumatic methic a compressed gas is used such as air, a combustion gas, an inert gas or a paraffin gas. Various methods for mounting the cover plate are disclosed.

25 Claims, 10 Drawing Figures

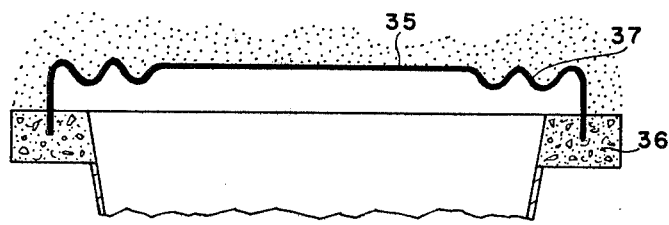
Fig.3
Fig.4
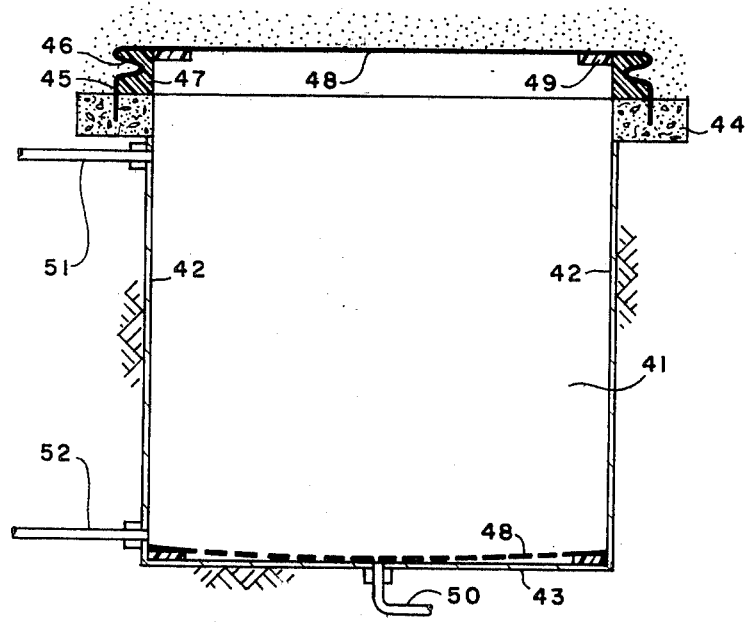
Fig.5
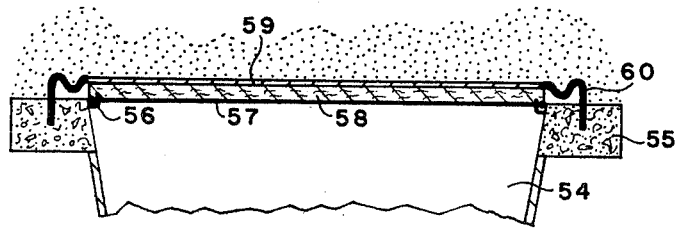

SUBTERRANEAN STORAGE OF LIQUIDS

The present invention relates to subterranean storage of liquids such as crude mineral oil, various distilled mineral oil fractions, including liquefied gaseous fraction, liquefied natural gas and the like.

Conventionally mineral oils and gases, whether crude or refined, are stored above ground in tanks and gas holders, mostly cylindrical, made as a rule of steel or reinforced concrete, erected above ground and usually grouped together in so-called tank farms. This conventional method of storage has various drawbacks. Thus for one a very solid construction is required in order to withstand the hydrostatic pressure of stored liquid and the additional gas pressure resulting from partial evaporation of the gas when the ambient temperature rises. Furthermore, in view of evaporation and in order to avoid the build-up of excessive pressure it is necessary to provide the tanks with means for vapor condensation which further adds to the costs. Moreover, even with vapor condensation the escape of some vapor to the atmosphere is practically unavoidable and the resulting losses are both an economic burden and an ecologic nuisance.

Furthermore, where the stored fluid is inflammable fire risk is great whenever a tank is damaged and where, as is conventional, the tanks are grouped in so-called tank farms fire in one of the tanks is liable to spread to neighboring tanks. Moreover, in times of war above ground tank farms have the further disadvantage that they are exposed to acts of war.

It may thus be summed up that the conventional above ground storage of liquids such as crude mineral oil, distilled oil fractions and liquefied gas is costly and undesirable from ecological, safety and security considerations.

In view of all the above, ways and means have been sought for the subterranean storage of liquids and in particular fuel. According to one proposal natural or artificial subterranean cavities are used. This requires adequate rock formations and in addition, in many instances, special treatment for the lining of the cavity in order to render it impermeable to the stored liquid. This method is very costly and in addition has the drawback that in many places such as plains and coastal areas the subterranean rock formations are unsuitable.

It has also been proposed to submerge essentially conventional tanks in the soil by erecting them in suitably sized pits. When the tank is completed the pit is filled and covered from above. This method of storage is even more expensive than the conventional one since to the actual costs of the tank the excavation costs and the costs involved with the filling and covering of the pit once the tank has been erected, have to be added. Moreover, as the top of such a tank has to support the weight of the soil dumped thereon, special structural measures have to be taken for this purpose which adds still further to the costs.

It is the object of the present invention to provide a new method and means for the subterranean storage of liquids that is safe, applicable to any soil formation and significantly cheaper than all known above ground and subterranean storage methods.

In accordance with the invention there is provided a subterranean storage pool for liquids comprising a pit whose bottom and side walls are impermeable to the stored liquid and having means for the introduction and withdrawal of liquid, characterized by the provision of a pressure transmitting cover plate over the pit sealingly applied thereto, a protective body superimposed on the cover and bearing thereon serving for physical protection from above, and means for establishing and maintaining within the pool a pressure not exceeding the pressure exerted by the protective body on the cover plate from above.

The cover may be applied to the pit in any suitable way. For example, circumferential retainer means such as a belt may be provided near the edges on which the rim portion of the cover may be brought to bear or within which said rim portion may be anchored.

The covering body may consist of sand, soil, stones, rubbish, rocks or mixtures thereof and depending on the depth by which the pool is submerged, may be level with the surrounding terrain or project thereabove. The thickness of the covering body will depend on design requirements: Where, for example, safety against acts of war is a major consideration and the pool is to be protected against direct hits, the protective body will be comparatively thick. Where, on the other hand, the protective body is only intended to carry traffic or some light structures and be effective only against the effects of indirect hits, or where acts of war are not a governing consideration, the protective body may be considerably thinner.

The pressure to be maintained within the pool depends on the thickness of the protective body. By way of example, a pressure of 3 atm. gauge and a correspondingly dimensioned protective body have been found suitable for many purposes.

In a storage pool according to the invention the cover plate fulfils two functions: For one it prevents the leakage of vapor and gases from the top of the structure. In addition it fulfils a diaphragm-like action in that it transmits the pressure prevailing within the structure to the covering body thereby counteracting the weight of the protective body and supporting the latter. To fulfil these functions the cover plate should preferably have a certain degree of resilience. For example, a thin steel plate, e.g. 2–20 mm thick, is suitable. The resilience of such a plate may be improved by making the rim portion corrugated.

Instead of steel any other suitable metal or alloy may also be used.

The invention also provides a method for the storage of liquids in a subterranean pool suitably lined so as to render it impermeable, characterized in that a pressure transmitting cover plate is sealingly mounted on the pool, protective body forming material is dumped on the cover and concurrently therewith pressurized fluid is charged into the pool to build up therein a pressure acting on the cover from below to counteract the weight of the dumped material bearing thereon, and after a protective body of a desired size is built up and the pressure inside the pool is such as to sustain the protective body from below via said pressure transmitting cover plate, the liquid to be stored is charged into the pool under pressure such that the pressure prevailing within the pool is maintained.

It is thus seen that the storage method according to the invention is based on a new concept by which an elevated pressure within the storage space is utilized for structural purposes. This is a total departure from conventional approaches where pressure inside the storage tank was an unavoidable problem that had to be minimized and resistance to outside pressure was provided by solid structural elements.

A storage pool according to the invention may be circular or of any other desired horizontal cross-sectional shape. Where the horizontal cross-sectional shape is other than circular, it is preferred that the transitions between contiguous side walls be rounded off so as to avoid the formation of corners.

Depending on the nature of the soil, the side walls of the pit may be vertical or sloping. Where the pit is excavated in solid rock, e.g. granite, the side walls may be vertical. Where, on the other hand, the pit is excavated in weak soil the side walls will form with the bottom of the pit an obtuse angle such that the complementary angle is smaller than the natural angle of this soil.

The cover plate may be applied to the pit in any suitable way. For example, it is possible to have the cover plate rest freely on an internal circumferential shoulder of a retainer belt with the interposition of suitably designed gaskets. Since at no time the pressure within the pool exceeds the pressure on the cover from above due to the weight of the protective body, there will occur practically no leakage of any gaseous components from within the storage space.

Alternatively, the cover plate may be anchored in a retainer belt. For example, where the retainer belt is made of concrete it is possible, during casting to insert therein a metal collar projecting therefrom and subsequently to weld the cover to such collar. Preferably the collar and cover are made of the same metal, e.g. steel sheet.

In accordance with one embodiment of the invention to be referred to hereinafter as the hydraulic method, the stored liquid, e.g. fuel, is disposed within the storage space on top of a heavier pressurized working liquid, e.g. water. In accordance with this embodiment both the stored liquid and the working liquid are kept each under the desired pressure prevailing within the storage container by means of pumping devices. When more stored liquid is charged into the pool a corresponding amount of working liquid is withdrawn, and conversely when stored liquid is withdrawn a corresponding amount of working liquid is pumped in.

In accordance with the foregoing embodiment, mounting the cover plate after the pit is completed with lining and retainer means may be accomplished by filling the pit with water and placing on the water surface a floating plate which serves as working platform for the mounting of the cover. When this mounting method is resorted to, the material of which the floating plate is made is preferably so selected as to be inert to the stored liquid and floatable thereon. In this way it is not necessary to withdraw the floating board after the mounting of the cover which would be a very difficult operation, if at all possible. In operation, the floating plate is pressed against the cover plate and serves as protection of the latter against possible corrosion.

Alternatively, it is also possible to assemble the cover plate on the bottom of the pit and fit it with a float so that it becomes floatable on the working liquid, e.g. water, and to fill the latter with the working liquid so that the cover floats on it. When the cover reaches the level where it is to be mounted no more water is introduced and the cover is mounted on the retainer in any suitable way, e.g. by welding it to a collar anchored therein.

In accordance with another embodiment of the invention to be referred to hereinafter as the pneumatic method, the desired pressure within the storage space is maintained by means of compressed gas occupying the space above the stored liquid. The nature of the gas in such an embodiment will be selected in accordance with the properties of the stored liquid. Thus in some cases air may be used which is of course the simplest and cheapest. However, in other cases, e.g. where stored liquid is highly inflammable, the presence of oxygen may be undesirable and in such cases oxygen free gases will have to be employed, e.g. exhaust gases from an internal combustion engine, e.g. a diesel engine.

Where in practicing the pneumatic method the walls of the pool are vertical, it is possible, for example, to mount the cover plate by assembling it on the bottom of the pit with such dimensions that it fits tightly into the pit, and gradually pumping compressed gas underneath the cover plate whereby the latter is gradually lifted. Preferably the plate is fitted with a circumferential packing. A collar is provided in the retainer belt, preferably having a bent-over portion, and when the cover plate has reached the level of the collar it is welded thereto. Once the cover plate is in position the protective body forming material can be dumped thereon and the gas pressure within the storage space is gradually increased with the build-up of the protective body. When the protective body is completed and there is no more pressure increase on the cover plate from above, the gas pressure within the storage pool is kept constant. Liquid for storage, e.g. fuel, can now be charged into the storage space at the pressure prevailing therein and during the filling in of liquid compressed gas is withdrawn from the storage pool at a rate so controlled that the pressure within the pool remains constant.

The foregoing embodiment is unsuitable in cases where the side walls of the pit are sloping. In such cases it may be necessary or desirable to place a working platform at the top. One way of doing this is to suspend a gas proof fabric on upward projecting hooks anchored in the upper edge region of the ditch or the retainer means, and to pump gas, e.g. air, at a slightly elevated pressure into the pit. A solid plate is now created on top of the fabric, for example, by spraying thereon a hardenable liquid synthetic material, e.g. a foaming one. As the spraying operation proceeds the pressure within the pit is gradually raised so as to counteract the increasing weight of the platform. When the sprayed synthetic material has hardened and the platform is completed, the cover, e.g. a steel plate, is mounted in any suitable way and the pool is now ready to receive the stored liquid. Under the operational pressure the working platform is pressed from below against the lower face of the cover, possibly being lifted from the hooks in the process, and thus serves as an additional protective lining against corrosion.

In cases in which the walls of the pool are vertical it is possible in accordance with the pneumatic method to provide within the pit a floating partition for separation between the stored liquid, e.g. fuel, and the compressed gas. In this way direct contact between the gas and the stored liquid is avoided and any undesired interaction between the two is prevented. For example, where the stored liquid is inflammable fuel, the floating partition makes it possible to use air as the compressed gas which for safety reasons would not have been possible if the gas and the fuel were in direct contact with each other.

During operation the pressure transmitting cover plate acting as diaphragm will move up or down in accordance with pressure fluctuations within the storage pool. Such up and down movements may be utilized to advantage for pressure control. To this end the upper face of the cover may be fitted with upright indicator rods penetrating through and emerging out of the protective body and freely movable therein. With any movement of the cover these indicator rods rise or sink, as the case may be and the operator then knows when to increase or release pressure. If desired, optical, laser or any other type sensor devices may be associated with the indicator rods and be adapted to operate automatically the pressure control means.

The invention is illustrated, by way of example only, in the accompanying drawings in which:

FIG. 3 is a section through a top part of a pool according to the invention having a partly corrugated cover plate;

FIG. 4 is a vertical section through another embodiment operating by the pneumatic method, during erection;

FIG. 5 is a vertical section through yet another embodiment operating by the pneumatic method, during erection;

Figure 1:
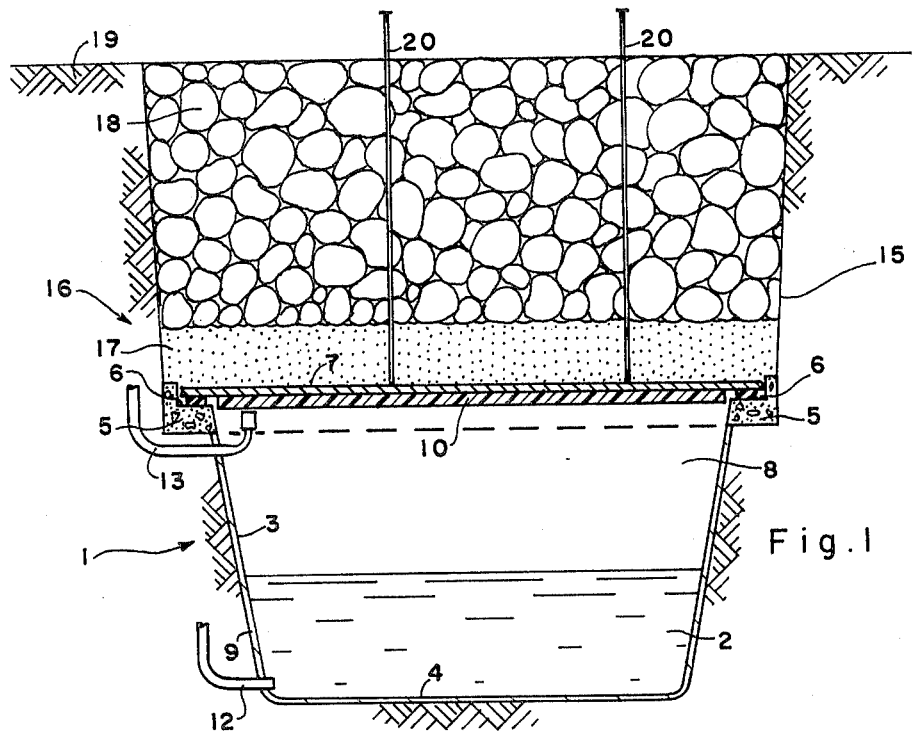
FIG. 1 is a vertical section through a subterranean storage pool according to the invention operating by the hydraulic method.

The storage pool 1 shown in FIG. 1 operates by the hydraulic method. It comprises a pit 2 with sloping side walls 3 and a bottom 4, all of which are lined with concrete, which may if desired have a steel sheet embedded therein and by which the pit is rendered impermeable. Around the upper edge of side wall 3 is located a circumferential retainer belt 5 having an inner circumferential shoulder 6 which supports a steel plate 7 with interposition of a gasket. Plate 7 serves as the pressure transmitting cover.

The pool 1 is designed to hold a body of oil 8 floating on a body of water 9. Floating on top of the oil body 8 and pressed against cover plate 7 is a board 10 which during erection serves as a working platform for mounting cover 7 and which in the operative pool protects the cover plate 7 from below against corrosion.

A pipe 12 which is connected to a suitable pumping station (not shown) serves for the introduction and withdrawal of a working liquid, e.g. water, according to requirements, and another pipe 13 also leading to a pumping station (not shown), serves for the introduction and withdrawal of the stored liquid, e.g. oil.

Pit 2 is the lower part of an excavation 15. Within excavation 15 and superimposed on cover plate 7 is a protective body 16 comprising a sand layer 17 and a stone layer 18 whose upper surface is level with the terrain 19.

Mounted on the upper face of cover plate 7 are two indicator rods 20 both of which project above the protective body 16.

For the construction of the above storage pool an excavation 15 is made whose lower part is shaped into pit 2. Subsequent thereto the bottom 4 and side wall 3 of pit 2 are lined with concrete, if desired having embedded therein a steel plate, and in this way the pit is rendered impermeable. A working liquid is now pumped into the pit to capacity and the floating plate 10 is introduced to serve as working platform. With the aid of this platform cover plate 7 is mounted and once this is completed sand is dumped onto the cover plate to produce the sand layer 17 of protective body 16. As the weight on cover plate 7 gradually increases the hydraulic pressure within the pool is also gradually increased by pumping more working liquid under pressure. When the sand layer 17 is completed stones are dumped on top thereof to form the stone layer 18 of the protective body 16 and again, as the dumping proceeds the pressure within the pool is increased by pumping more water under pressure into it. When stone layer 18 is completed constant pressure is maintained in the pool. The liquid to be stored can now be introduced through pipe 13 and as oil is introduced water is withdrawn from pipe 12 so that constant pressure is maintained within the pool throughout.

In consequence of the pressure prevailing within the pool the floating board 10 is pressed against the lower face of cover 7 and serves as a protective lining of the latter.

If during operation the pressure within the pool deviates from the desired constant value the indicator rods 20 rise or sink, as the case may be, and the operator will thereupon release or increase the pressure as required.

If desired, detector means may be provided, which may be optical, laser or any other type and which control automatically the pressure inside the pool in dependence on the level of the indicator rods 20.

Figure 2:
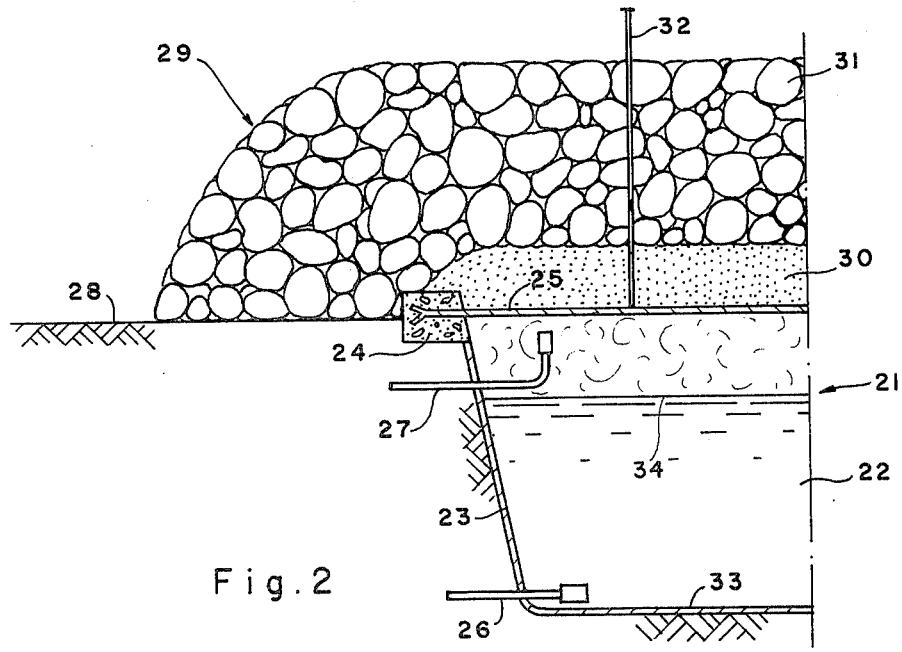
FIG. 2 is a fragmentary vertical section through another embodiment operating by the pneumatic method.

The embodiment of FIG. 2 differs from the one of FIG. 1 in two respects: For one the protective body is projecting above the surrounding terrain and secondly it operates by the pneumatic method. As shown, a storage pool 21 comprises a pit 22 having sloping walls 23 and a bottom 24, all lined with concrete, if desired having a steel plate embedded therein, and are thus rendered impermeable. Near the upper edge pit 22 comprises a circumferential retainer belt 24 having anchored therein the rim portion of a cover plate 25. A pipe 26 connected to a pumping station (not shown) serves for the introduction and withdrawal of oil and a pipe 27 serves for the introduction and withdrawal of compressed gas.

In this embodiment cover plate 25 is substantially level with the terrain 28 and the protective body 29 bulges above the surface. As in the previous embodiment the protective body 29 comprises a sand layer 30 and a stone layer 31. Also as in the previous embodiment indicator rods 32 (only one of which is shown) are connected to the upper face of cover plate 25 serving the same purpose as before and operating in the same manner.

During operation the pool holds a body of stored liquid and above it pressurized gas. In FIG. 2 the interface between the liquid and gaseous phases are indicated at 34.

For mounting the cover plate 25 in the construction of a storage pool according to FIG. 2 one may employ the same method as before filling the pool with a working liquid and employing a floating working platform. In such a case the pressure build-up during the erection of the protective body 29 is achieved by the introduction of compressed gas which gradually displaces the working liquid in the pool until it is entirely removed. When the erection of protective body 29 is completed and all working liquid removed from the pool, the liquid to be stored is introduced and compressed gas is released at such a rate that the pressure within the pool remains substantially constant.

Instead of the foregoing method any other suitable method can be employed for mounting cover plate 25, e.g. any of those to be described hereinafter.

In the embodiment of FIG. 3 the cover plate 35 is anchored in the retainer belt 36 and comprises a corrugated circumferential portion 37 which increases its resiliency.

One method for mounting a cover plate in a storage pool according to the invention operating by the pneumatic method will now be explained with reference to FIG. 4. As shown a pit 41 has upright side walls 42 and a bottom 43 all lined with concrete so as to render them impermeable. Around the upper edge portion of side walls 42 is located a retainer belt 44 having anchored therein a steel plate collar 45 which has an upper corrugated portion 46 whose inner cavities are filled with a foam filler 47. The cover plate 48 is fitted with a circumferential packing 49. At the beginning of the operation the cover plate 48 is assembled on bottom 43 as shown in broken lines in the figure. Air at a slightly elevated pressure is pumped in through pipe 50 and thereby the cover plate 48 is gradually lifted until it reaches the final upper position shown in drawn out lines in the figure. When this position is reached the edges of the cover plate 48 are welded to the collar 45 and the air supply through pipe 50 is shut off. At this stage compressed gas is injected through pipe 51 and the protective body is erected on top of cover plate 48 as described hereinbefore, the pressure inside the pool 41 being increased as the erection of the protective body progresses. When this is completed liquid for storage, e.g. fuel, is introduced into the pool through pipe 52.

The above method is suitable only for pools with vertical side walls. An alternative method also suitable where the walls are sloping is now described with reference to FIG. 5. As shown, a circumferential belt 55 is located near the edge portion of a pit 54 only the upper part of which is shown. A number of hooks 56 are anchored in the belt 55 projecting towards the interior and having an upright portion from which is suspended a gas tight fabric 57. Air is injected into the pit so as to maintain the fabric 57 fully stretched and hardenable plastic material in liquid form is sprayed onto the fabric and allowed to cure and solidify thereon to produce a solid board 58 serving as platform. During this operation the weight pressure on fabric 57 is gradually increased due to the formation of board 58 thereon and consequently the air pressure inside the pit is also gradually increased in order to maintain the sheet fully flattened out until the board has fully solidified. When spraying and curing of the plastic material is completed the resultant board 58 serves as platform and the plate 59 is mounted by welding it to the collar 60 anchored in belt 55. The pool is now operational and in consequence of the establishment of an elevated pressure therein board 58 is pressed upwards against cover plate 59 and in the process may be lifted out of hooks 56. In its new position the board 58 serves as a lining for the lower face of cover plate 59 to protect it against corrosion, similar as the floating board in the embodiment of FIG. 1.

Figure 6:
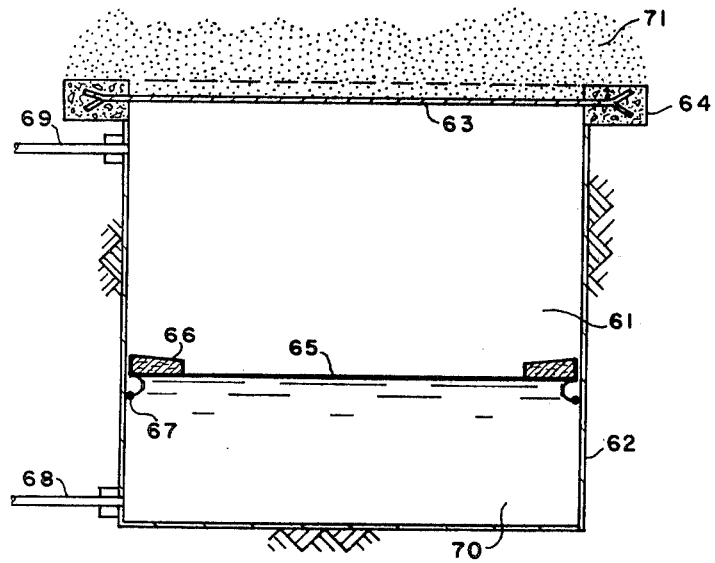
FIG. 6 is a vertical section through yet another embodiment operating by the pneumatic method, comprising a floating partition.

In the embodiment of FIG. 6 the pool forming pit 61 has again upright side walls 62 and the cover plate 63 is anchored in the retainer belt 64 having been mounted by any of the methods described hereinbefore. Inside the pool there is provided a floating partition 65 fitted with a circumferential float 66 and a circumferential, spring loaded gasket 67. Liquid for storage is introduced and withdrawn throughout pipe 68 and pressurized gas is introduced and withdrawn through pipe 69. The floating partition 65 floats on the body of liquid 70 within the pool and in this way any contact between the compressed gas filling the space above the partition and the stored liquid located below the partitin is avoided. With this embodiment it is thus possible, for example, to use compressed air in conjunction with the storage of fuel which otherwise would not be possible because of inflammation risks.

As before a protective body 71 is superimposed on cover plate 63.

As mentioned the simplest and cheapest way to produce a gas pressure within a storage pool according to the invention is to use compressed air. However this may not always be possible or desirable and in such cases alternative ways have to be used. One such way is to use the exhaust gases from a diesel engine which may be injected directly into the pool, or preferably with the interposition of an expansion tank from where they are pumped under pressure.

Another possibility is to use an inert gas, e.g. nitrogen or carbon dioxide, or a paraffin gas such as propane or butane, supplied from containers.

Figure 7:
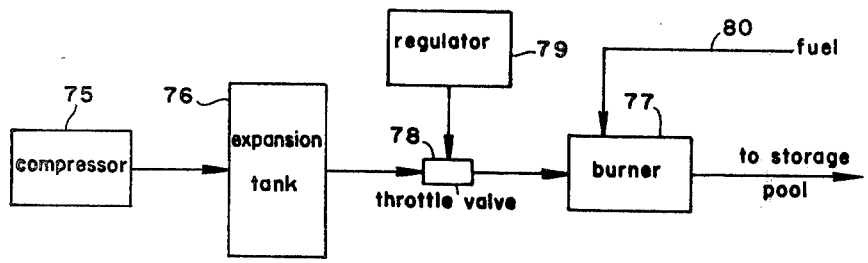
FIGS. 7-10 are block diagrams of four embodiments for the injection of compressed gas into a storage container according to the invention.

Some other possibilities are shown diagrammatically in FIGS. 7-10. In FIG. 7 a compressor 75 injects compressed air into an expansion tank 76 from where the compressed air is fed into a burner 77 through a throttle valve 78 controlled by automatic pressure regulator means 79. Fuel is injected into burner 77 through pipe 80 and the fuel-air mixture burns inside the burner whereby the oxygen is consumed. The resulting pressurized combustion gases are fed into a subterranean storage pool according to the invention.

Figure 8:
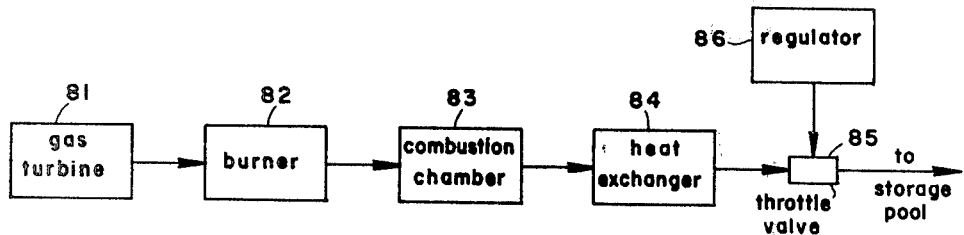

According to FIG. 8 the exhaust gases of a gas turbine 81 are charged into a burner 82 and from there into a combustion chamber 83 where combustion proceeds until total consumption of the oxygen. The combustion gases from chamber 83 are charged into a cooling heat exchanger 84 and from there via throttle valves 85 governed by pressure sensitive automatic regulator means 86 into a subterranean storage pool according to the invention.

Figure 9:
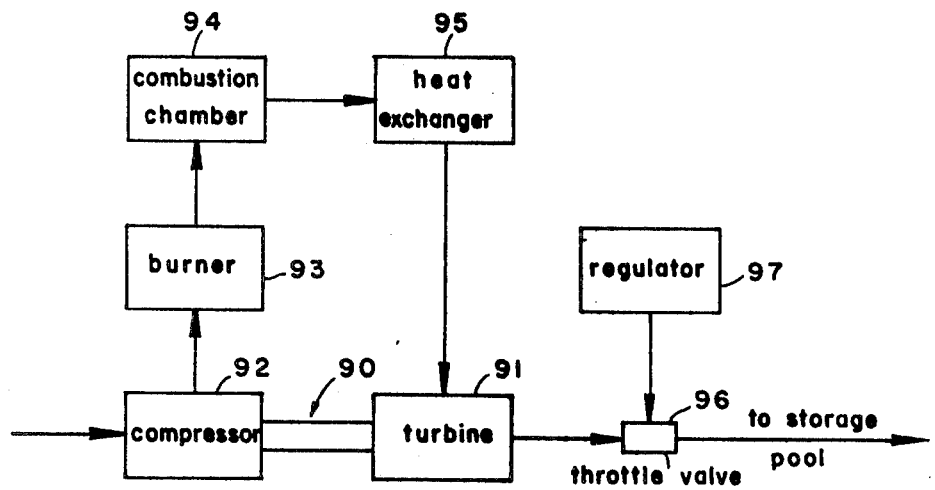

According to FIG. 9 a turbo compressor unit 90 is used, consisting of a turbine 91 as prime mover and a compressor 92. Compressor 92 charges compressed air into a burner 93 from where it proceeds to combustion chamber 94 where combustion takes place. The combustion gases from the combustion chamber are charged into a cooling heat exchanger 95 and from there into turbine 91 which is thus operated. The gases expanding from turbine 91 are then charged via a throttle valve 96 controlled by pressure sensitive automatic regulator means 97 into a subterranean storage pool according to the invention.

Figure 10:
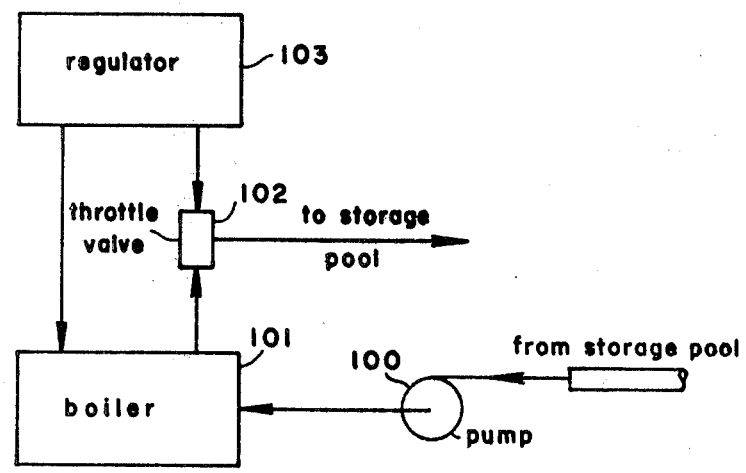

By yet another embodiment shown in FIG. 10 liquid fuel is withdrawn from the subterranean storage pool by means of a pump 100 and charged into a boiler 101 where it is evaporated. The resulting gaseous fuel is returned to the tank via a throttle 102 governed by automatic regulator means 103 responding to the pressure prevailing in boiler 101.

Experience gained in accordance with the invention and costing made on the basis thereof show that the storage costs according to the invention are much less than the costs involved with conventional storage in steel or concrete tanks.

I claim:

1. A subterranean storage pool for liquids, comprising:
   a pit whose bottom and side walls are impermeable to the stored liquid;
   a pressure transmitting cover plate sealingly applied to said pit;
   a protective body superimposed on said cover plate and bearing thereon, thereby serving for physical protection from above;
   a quantity of stored liquid within said pit;
   a quantity of a heavier working liquid within said pit, said stored liquid floating on top of and in direct contact with said heavier working liquid; and
   pressure means for maintaining a hydraulic pressure within said pit beneath said cover plate and protective body, said pressure means including transfer means for the separate introduction and withdrawal of said stored and working liquids, the pressure being maintained by said pressure means not exceeding the pressure exerted by said protective body on said cover plate from above.

2. A subterranean storage pool according to claim 1, wherein the working liquid is water.

3. A subterranean storage pool for liquids, comprising:
   a pit whose bottom and side walls are impermeable to the stored liquid;
   a pressure transmitting cover plate sealingly applied to said pit;
   a protective body superimposed on said cover plate and bearing thereon, thereby serving for physical protection from above;
   a quantity of stored liquid within said pit and in direct contact with the bottom and a portion of the side walls thereof; and
   pressure means for maintaining a pneumatic pressure within said pit beneath said cover plate and protective body and above said stored liquid, said pressure means including transfer means for the separate introduction and withdrawal of pressurized gas and said stored liquid, the pressure being maintained by said pressure means not exceeding the pressure exerted by said protective body and said cover plate from above.

4. A subterranean storage pool in accordance with claim 3, wherein said pressurized gas is in direct contact with said stored fluid.

5. A subterranean storage pool according to claims 1 or 3, comprising circumferential retainer means for said cover plate.

6. A subterranean storage pool according to claim 5, wherein said circumferential retainer means is a belt.

7. A subterranean storage pool according to claims 1 or 3, wherein said cover plate is submerged below the ground level and the upper face of said protective body is substantially level with the terrain.

8. A subterranean storage pool according to claim 3, wherein said protective body projects above the terrain.

9. A subterranean storage pool according to claim 1, wherein said cover plate is of metal sheet.

10. A subterranean storage pool according to claim 9, wherein the outer portion of said cover plate is corrugated.

11. A subterranean storage pool according to claim 3, wherein said pit has vertical side walls, and further including a horizontal partition floating on said stored liquid and sealing tightly said stored liquid from said pressurized gas thereabove.

12. A subterranean storage pool according to claim 3, wherein said pressure means includes means for the injection of compressed air.

13. A subterranean storage pool according to claim 3, wherein said pressure means includes means for the injection of exhaust gases from an internal combustion engine.

14. A subterranean storage pool according to claim 3, wherein said pressure means includes means for the injection of exhaust gases from a combustion installation.

15. A subterranean storage pool according to claims 3 or 4, wherein said pressure means includes means for the injection of an inert gas.

16. A subterranean storage pool according to claim 3, wherein said pressure means includes means for the injection of a paraffin gas.

17. A method for storing liquids in a subterranean pit suitably lined so as to render it impermeable, comprising:
   fixedly mounting a pressure transmitting cover plate on the pit;
   dumping protective body forming material on the cover plate and concurrently therewith charging pressurized fluid into the pit to build up therein a pressure acting on the cover plate from below to counteract the weight of the dumped material bearing thereon; and
   after a protective body of some size is built up and the pressure inside the pit is such as to sustain the protective body from below via said pressure transmitting cover plate, charging the liquid to be stored into the pit under pressure such that the pressure prevailing within the pit is maintained.

18. A storage method according to claim 17, wherein the pressure within the pit is established hydraulically by means of a pressurized working liquid heavier than the stored liquid.

19. A storage method according to claim 18, wherein the working liquid is water.

20. A storage method according to claim 17, wherein the pressure within the pool is established pneumatically.

21. A storage method according to claim 17, wherein said mounting step includes setting up a working platform at the required level, said working platform being designed to remain within the pit after said cover plate is mounted.

22. A storage method according to claim 21, wherein the pressure within the pit is established hydraulically by means of a pressurized working liquid heavier than the stored liquid, and wherein said platform is set up by filling the pit with the working liquid and floating the platform thereon.

23. A storage method according to claim 21, wherein said step of setting up a platform comprises suspending a fabric from hooks near the edges of the pit and spreading hardenable liquid plastic material thereon to form a solid platform.

24. A storage method according to claim 18, wherein the pit has vertical side walls, and wherein said mounting step comprises assembling the cover plate at the bottom of the pit, fitting the cover plate with means adapting it to float, and lifting the so-assembled cover plate into position hydraulically by injecting a working fluid into the pit from below the cover plate.

25. A storage method according to claim 20, wherein the pit has vertical side walls, and wherein said mounting step comprises assembling the cover plate at the bottom of the pit, fitting the cover plate with a circumferential packing, and lifting the so-assembled cover plate into position pneumatically by blowing a gas under pressure into the pit from below the cover plate.

* * * * *